April 18, 1933.  R. H. ROSENBERG  1,904,931

METHOD OF ASSEMBLING METAL MEMBERS WITH RUBBER BUSHINGS

Filed Jan. 20, 1931

INVENTOR.
RALPH H. ROSENBERG
BY John P. Tarbox
ATTORNEY.

Patented Apr. 18, 1933

1,904,931

UNITED STATES PATENT OFFICE

RALPH H. ROSENBERG, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF ASSEMBLING METAL MEMBERS WITH RUBBER BUSHINGS

Application filed January 20, 1931. Serial No. 509,898.

Rubber bushed members in which the rubber bushing is held in a condition of substantial elongation or compression between two telescoping metallic members have come into increasing use within the last few years. Such members have been employed as spring shackle bushings, engine mountings, vibration dampeners and in various types of oscillating joints. In my application Serial No. 424,519, filed January 30, 1930, I have proposed the use of such a member as a shaft coupling in the nature of a universal joint. Of the universal joints upon which experiments have been conducted in this connection, I have found the one which is most effective in use to be that disclosed in my application Serial No. 427,728, filed February 12, 1930. In this type of joint, a spherical member is telescoped within a member of straight cylindrical form with a rubber bushing held between the spherical and cylindrical members in a condition of substantial elongation beyond its natural shape.

The problem of assembly of telescoped metallic and rubber members of this type in such a way that the rubber member will be held in substantially elongated condition between the telescoped members has proven a very puzzling one. My present invention involves an assembly fixture for performing this operation in a simple and rapid manner by the use of relatively inexpensive machinery.

The principal object of my invention has been to devise a simple mechanism of this kind for assembling the parts in the desired relationship. Further features of my invention relate to an improved method of assembly of the parts of the joint.

Other objects and advantages of my invention will be apparent from a reading of the sub-joined specification in the light of the attached drawing, in which, Figure 1 is a central sectional view through my improved assembly mechanism.

Figures 1, 2, 3:
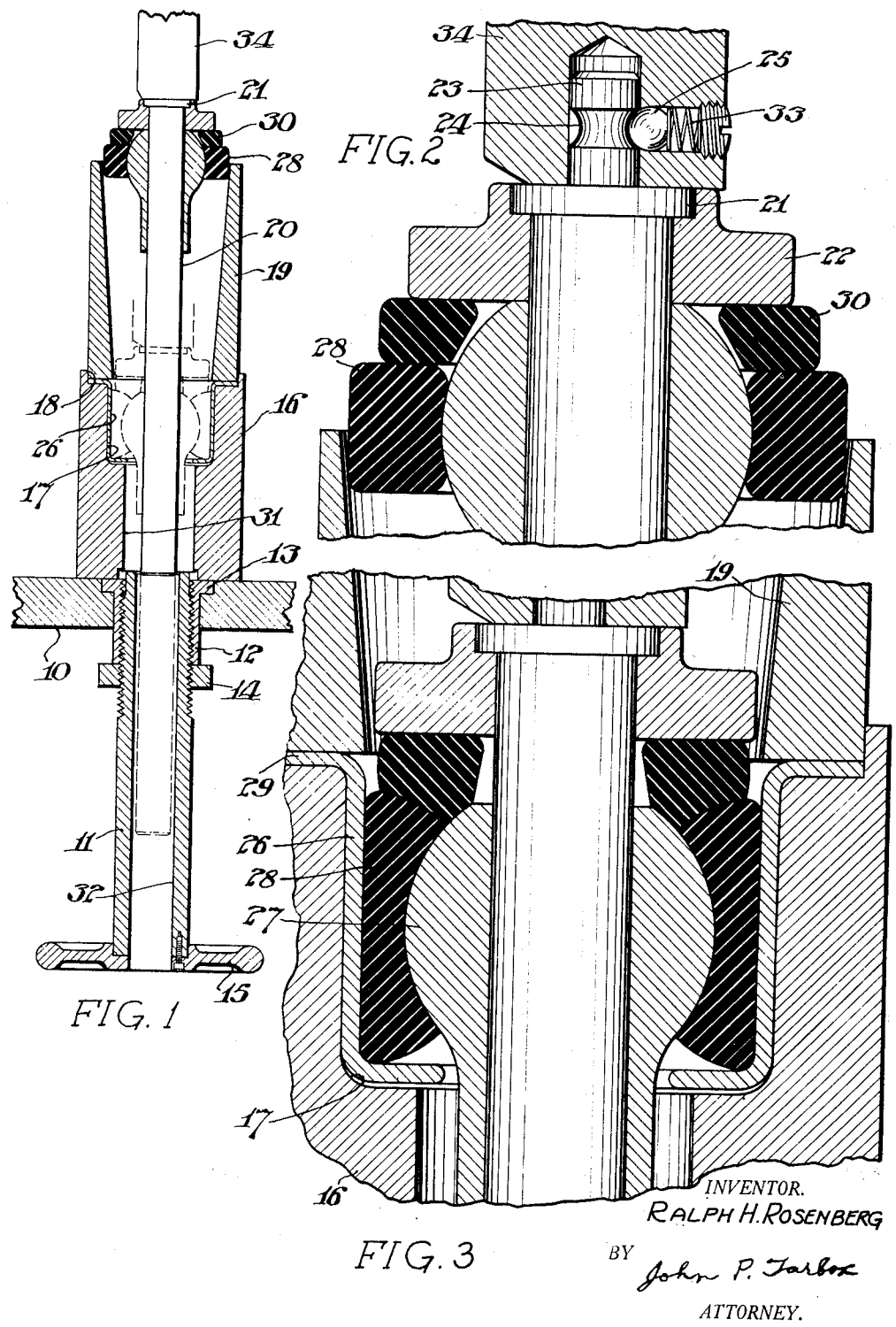
Figure 2 is a detail sectional view of the upper part of the mechanism illustrated in Figure 1 illustrating an early stage of the assembly operation.
Figure 3 is a similar view illustrating the final stage of the assembly operation.

26 designates the female member of my joint, this member being provided with reversely formed flanges on its opposite ends adapted to confine the rubber bushing and define its position on one end and be secured to one of the shafts to be coupled on the other. The male member of the joint consists of a longitudinally curvilinear member 27 having a longitudinal bore therethrough adapted to receive the second shaft. A rubber bushing 28 is adapted to be held between these members in a substantially elongated condition, the tendency of the rubber to return to its normal shape effecting a strong frictional grip upon the male and female members of the joint and thus affording a flexible drive through the rubber mass between the coupled shafts.

I will first describe the improved mechanism which I have devised to accomplish the objects of my invention, and thereafter explain my improved method as practiced in relation to this mechanism.

Referring to the drawing by reference characters, the numeral 10 indicates the base of a suitable support upon which my assembly mechanism rests. A guide 11 is secured to the under side of this base and is threaded into a sleeve 12 which is provided with a flange 13 adapted to abut against a shoulder in the top of the base. The threaded connection between these parts affords a measure of vertical adjustment for the guide and the parts are retained in adjusted relationship by means of a suitable locking nut 14. A handle 15 is provided on the lower end of the guide to effect the desired adjustment.

A socket member 16 which is adapted to receive the female member of the universal joint assembly rests upon the upper side of the table directly above the guide 11 and is provided with a bore 31 aligning with the bore 32 in the guide for a purpose to be later explained.

The bore in the socket member is enlarged toward its upper end as indicated at 17 to receive the female member 26 of the joint. A recess 18 is formed in the upper end of the socket member to receive the annular flange 29 extending outwardly from this female member. A funnel 19 is adapted to telescope within the recess 18 in the upper end of the socket member and to abut the flange 29 of the female member of the joint when assembled therewith.

A plunger 20 is adapted to be received within the funnel 19 for reciprocatory movement therethrough. This plunger is provided with an annular collar 21 upon its upper end adapted to act as an upper limiting stop for a head 22 which is received upon the upper end of the plunger. The plunger is further provided with a pin 23 extending upwardly from the collar 21, this pin being provided intermediate its ends with a groove 24 adapted to receive a ball 25 within a ram 34 to releasably lock the ram and plunger together. The ball 25 is urged by a spring 33 into locking engagement with the groove in the pin.

In the practice of my invention the socket member 16 is first placed upon the base 10 with its bore 31 in alignment with the bore 32 of the guide 11. The female member 26 of the joint is next placed within the bore 17 of the socket member and is with its flange 29 abutting the shoulder adjacent the upper end of the socket. The funnel 19 is next placed in alignment with the aligned bores 31 and 32 with its lower end guided by the edge of the recess 18 in the upper end of the socket member and abutting the flange 29 of the female member of the joint.

Either before or after this operation the rubber bushing is inserted by hand upon a central portion of the spherical male member of the joint and this member with the bushing thus positioned and the head 22 abutting the annular collar 21 on the upper end of the plunger 20 is assembled against a rubber washer 30 which has been previously placed against the lower end of the head 22 as indicated in Figure 2. The bore of the male member of the joint receives the body of the plunger 20, this male member being slid over the plunger until the rubber bushing 28 abuts the washer 30 as indicated in Figures 1 and 2. The assembled male member of the joint, together with the bushing 28, washer 30 and head 22 is next telescoped with the funnel and socket assembly as indicated in Figures 1 and 2, the rubber bushing 28 resting within the upper end of the funnel and preventing the descent of the assembly into the funnel.

The ram 34 which may be reciprocated by a fluid pressure motor or other suitable means is next depressed, and secured to the pin 23 by reason of the entry of the ball 25 within the groove 24 of the pin. Fluid pressure being applied to the assembly, the ram forces the head 22, washer 30 and the assembled joint part downwardly. As the rubber bushing 28 passes through the restricted part of the funnel it is deformed longitudinally by the restriction of its outer periphery and its confinement between the inner wall of the funnel and the male member of the joint. This causes it to flow longitudinally in both directions. This flow takes place during the entire movement of the male member of the joint and the bushing through the funnel, the parts assuming at the end of the operation the relative positions indicated in Figure 3.

The rubber washer 30 performs the very important function of preventing the flow of the rubber of the bushing into the space between the head 22 and the walls of the funnel. The normal diameter of this rubber washer is greater than that of the head 22 and less than that of the bushing 28. The washer is thus able to exert a positive push upon the entire area of the top of the bushing during its progress through the more restricted parts of the funnel. It would be impossible to use a head 22 of sufficient outer circumference to effect the assembly operation without the interposition of a yielding washer of this type by reason of the fact that such a head could not pass through the lower part of the funnel. On the other hand, a head of sufficiently small diameter to pass through the entire funnel would be subject to the objection that a portion of the rubber would tend to flow upwardly about the head. The interposition of the rubber washer 30 thus affords an adequate solution to a very vexing problem.

The assembled joint may be removed from the assembly fixture by the mere raising of the ram 34, the disconnection of the joint 24, 25 and the removal of the plunger 20, funnel 19 and socket member 16 from the assembled joint parts.

Although I have described the application of my improved method to a particular apparatus, it will be obvious that other apparatus may be used in the performance thereof. It will also be obvious that both the apparatus and the method may be modified without avoiding the essential spirit of my invention.

Modifications will be obvious to those skilled in the art and I do not therefore wish to be limited except by the scope of my sub-joined claims as interpreted in the light of my specification.

What I claim is:

1. An apparatus for assembling a rubber sleeve in telescoping relationship between a pair of metallic members which comprises a funnel, a plunger and a yieldable washer actuable by said plunger and adapted to abut an end of the rubber sleeve and force it through the funnel.

2. An apparatus for assembling a rubber sleeve in telescoping relationship between a pair of metallic members which comprises a funnel, a plunger and a yieldable annulus actuable by said plunger and adapted to abut an end of the rubber sleeve and force it through the funnel.

3. An apparatus for assembling a rubber sleeve in telescoping relationship between a pair of metallic members which comprises a funnel, a plunger and a rubber annulus actuable by said plunger and adapted to abut an end of the rubber sleeve and force it through the funnel.

4. An apparatus for assembling a rubber sleeve in telescoping relationship between a pair of metallic members which comprises a funnel, a socket member aligned with the smaller end of said funnel, and adapted to hold the outer metallic member, a plunger adapted to reciprocate within said funnel, a head associated with said plunger for reciprocation therewith and a yieldable member adapted to be received on the end of said head and force the rubber sleeve through the funnel into said outer metallic member.

5. An apparatus for assembling a rubber sleeve in telescoping relationship between a pair of metallic members which comprises a funnel, a socket member aligned with the smaller end of said funnel and adapted to hold the outer metallic member, a plunger adapted to reciprocate within said funnel, a head associated with said plunger for reciprocation therewith, said head having a maximum peripheral dimension less than the minimum inner peripheral dimension of said funnel, and a yieldable member adapted to be received on the end of said head and force the rubber sleeve through the funnel into said metallic outer member.

6. An apparatus for assembling a rubber sleeve in telescoping relationship between a pair of metallic members which comprises a funnel, a socket member aligned with the smaller end of said funnel and adapted to hold the outer metallic member, a plunger adapted to reciprocate within said funnel, a head associated with said plunger for reciprocation therewith, said head having a maximum peripheral dimension approximately equal to the minimum inner peripheral dimension of the funnel, and means yieldable radially to conform to the shape of said funnel received beneath said head and adapted to force the inner metallic member and assembled rubber sleeve through the funnel into the outer metallic member.

7. An apparatus in accordance with claim 4 in which the plunger is detachably connected to a ram for reciprocation therewith.

8. An apparatus for assembling a rubber sleeve in telescoping relationship between a pair of metallic members which comprises a funnel, a socket member aligned with the smaller end of said funnel and adapted to hold the outer metallic member, a plunger adapted to reciprocate within said funnel and having a longitudinal portion adapted to project beyond said funnel and socket member upon reciprocation thereof, a guide on the opposite side of said socket member from said funnel within which said last-named portion of said plunger is adapted to reciprocate, a head associated with said plunger for reciprocation therewith and an annulus adapted to be received on the end of said head and force the rubber sleeve through the funnel into said outer metallic member.

9. An apparatus for assembling a rubber sleeve in telescoping relationship between a pair of metallic members which includes a socket member adapted to receive the outer metallic member, and a plunger adapted to effect the assembly of the parts, said plunger having an extension projecting beyond the socket member, and a guide for the portion of the plunger extending beyond the socket member.

10. The method of assembling a rubber bushing between a pair of telescoping metallic members which comprises assembling the rubber bushing about a central portion of an inner metallic member, and forcing the bushing through a funnel into the outer metallic member by the application of pressure through a medium which is yieldable to conform to the shape of the funnel.

11. The method of assembling a rubber bushing between a pair of telescoping metallic members which comprises assembling the rubber bushing about a central portion of an inner metallic member, assembling a yieldable washer about this member in abutting relationship to an end of the bushing and forcing the washer and bushing into the outer metallic member.

12. The method of assembling a rubber bushing between a pair of telescoping metallic members which comprises assembling the rubber bushing about a central portion of an inner metallic member, assembling a yieldable washer about this member in abutting relationship to an end of the bushing and forcing the washer and bushing through a funnel into the outer metallic member.

13. The method of assembling a rubber bushing between a pair of telescoping metallic members which comprises assembling the rubber bushing about a central portion of an inner metallic member, assembling a rubber washer about this member in abutting relationship to an end of the bushing and forcing the washer and bushing through a funnel into the outer metallic member.

14. The method of assembling a universal joint comprising an inner member of curved longitudinal cross section, an outer member and a distorted rubber sleeve between said inner and outer members which comprises assembling the rubber sleeve centrally about the curved portion of said inner member, assembling a washer about said inner member in abutting relationship with respect to an end of said sleeve and forcing the assembled sleeve and washer through a funnel into telescoping relationship with respect to the outer member.

15. The method of assembling a universal joint comprising an inner member of curved longitudinal cross section, an outer member and a distorted rubber sleeve between said inner and outer members which comprises assembling the rubber sleeve centrally about the curved portion of said inner member, assembling a yieldable washer about said inner member in abutting relationship with respect to an end of said sleeve and forcing the assembled sleeve and yieldable washer through a funnel into telescoping relationship with respect to the outer member.

In testimony whereof I hereunto affix my signature.

RALPH H. ROSENBERG.